US008617855B2

(12) United States Patent
Tischendorf

(10) Patent No.: US 8,617,855 B2
(45) Date of Patent: Dec. 31, 2013

(54) IDENTIFICATION AND PROCESSING OF SECONDARY MATERIALS FOR THE COSMETICS-, PHARMACEUTICAL-, AND FUEL-PRODUCING INDUSTRIES AND ALSO FURTHER INDUSTRIAL FIELDS OF APPLICATION

(76) Inventor: Dieter Tischendorf, Hilders (DE)

( * ) Notice: Subject to any disclaimer, the term of this patent is extended or adjusted under 35 U.S.C. 154(b) by 695 days.

(21) Appl. No.: 12/446,894

(22) PCT Filed: Oct. 24, 2007

(86) PCT No.: PCT/EP2007/009224
§ 371 (c)(1),
(2), (4) Date: Apr. 23, 2009

(87) PCT Pub. No.: WO2008/049598
PCT Pub. Date: May 2, 2008

(65) Prior Publication Data
US 2010/0094033 A1 Apr. 15, 2010

(30) Foreign Application Priority Data
Oct. 26, 2006 (DE) .................. 10 2006 050 499

(51) Int. Cl.
*C12P 7/64* (2006.01)
*C12P 7/40* (2006.01)
*C07C 51/36* (2006.01)

(52) U.S. Cl.
USPC ............ 435/134; 435/136; 435/132; 435/41; 544/141; 544/175; 544/177; 544/124; 44/275

(58) Field of Classification Search
None
See application file for complete search history.

(56) References Cited

U.S. PATENT DOCUMENTS

| 4,321,141 | A | 3/1982 | Messing |
| 4,404,283 | A | 9/1983 | Neidleman et al. |
| 4,567,144 | A | 1/1986 | Neidleman et al. |
| 5,215,902 | A | 6/1993 | Tedder |
| 5,463,143 | A * | 10/1995 | Singleton et al. ............. 568/864 |
| 7,413,434 | B2 * | 8/2008 | Tischenborf .................. 431/288 |
| 2003/0235895 | A1 | 12/2003 | Bogan et al. |
| 2004/0003534 | A1 | 1/2004 | Murakami et al. |
| 2004/0037859 | A1 * | 2/2004 | Cecchi et al. ................. 424/401 |
| 2004/0047886 | A1 | 3/2004 | Murphy et al. |

FOREIGN PATENT DOCUMENTS

| CN | 1453332 A | 11/2003 |
| CN | 1474867 A | 2/2004 |
| DE | 10022056 | 11/2001 |
| EP | 1396531 | 3/2004 |
| EP | 1724325 | 11/2006 |
| RU | 2107722 | 3/1998 |
| WO | WO-2005010135 | 2/2005 |
| WO | WO-2006111997 | 10/2006 |

OTHER PUBLICATIONS

EUROPA, Summaries of EU Legislation, Animal by-products not inended for human consumption, Oct. 3, 2002, (3 pages).*
Price chemicals limited, Fat-Fax, Feb. 1, 1973, New Scientist, vol. 57, No. 831, (2 pages).*
Bredemeier, R. et al., Submersed Culture Produciton of Extracellula Wax Esters by the marine Bacterium *Fundibacte jadenis*, 2003, Marine Biotechnology, vol. 5, issue 6, pp. 579-583.*
Martinez, J., et al., Description of *Alcanivorax venustensis* sp. nov. and reclassificaitnof *Fundbacter jadenis* DSM 12178T (Bruns and Berthe-Corti 1999) as *Alcanivorzx jadensis* comb. nov., members of the emended genus *Alcanivorax*, 2003, Internationa Journal of Systematic and Evolutionary Microbiology, 53, pp. 331-338.*
Kaneshiro, T., et al., Oleyl Oleate and Homologous Wax Esters synthesized Coordinately from Oleic Acid by Acinetobacter and Corynedorm Strans, 1996, Current Microbiology, vol. 32, pp. 336-342.*
Bryn, K., et al., Occurance and Patterns of Waxes in *Neisseriaceae*, 1997, Journal of General Microbiology, 102, pp. 33-43.*
WHO consultants on caring for patients and hospital infection control in relation to human transmissible spongiform encephalopathies, WHO Infection contron guidelines for transmissible spongiform encephalophathies: Report of the WHO consultation, 2000, World Health Organization, Geneva, Gov't Doc #: WHO/CDS/CRS/APH/2000.3, (44 pages).*
"Nicht für den menschlichen Verzehr bestimmte tierische Nebenprodukte", Europa, Oct. 3, 2002, pp. 1-14, with English translation "Animal by-products not intended for human comsumption", Europa, Oct. 3, 2002, pp. 1-13.
"Verordnung (EG) Nr. 1774/2002 Des Europäischen parlaments and und des rates of Oct. 3, 2002", Amtsblatt der Europäischen Gemeinschaften, (2002), pp. 1-8, with English translation "Regulation (EC) No. 1774/2002 of the European Parliament and of the Council of Oct. 3, 2002", Official Journal of the European Communities, (2002), pp. 1-8.
Regulation (EC) No. 1774/2002 of the European Parliament and of the Council of Oct. 3, 2002 laying down health rules concerning animal by-products not intended for human consumption summary, http://europa.eu/legislation_summaries/food_safety/animal_nutrition/f81001_en.htm, last updated Aug. 27, 2008.
"Ullman's Encyclopedia of Industrial Chemistry", 5th Ed., 1989, Barbara Evers et al., eds; vol. A13, pp. 488-489; p. 314; vol. A4, pp. 146-150.
Park, M.O., et al., "Production of Alternatives to Fuel Oil from Organic Waste by the Alkane-producing Bacterium, *Vibrio furnissii* M1", Journal of Applied Microbiology, vol. 98, (2005), pp. 324-331.
Database WPI Week 199845, Derwent Publications, Ltd., AN 1998-529802, XP-002478959.
Kaneshiro, et al., "Oleyl Oleate and Homologous Wax Esters Synthesized Coordinately from Oleic Acid by Acinetobacer and Coryneform Strains", Database Medline U.S. National Library of Medicine, XP-002478958, 1996, Curr Microbiol, 32(6), 336-42.

* cited by examiner

*Primary Examiner* — Yate K Cutliff
(74) *Attorney, Agent, or Firm* — Novak Druce Connolly Bove + Quigg LLP

(57) ABSTRACT

A method for producing starting materials or additives for cosmetics, pharmaceuticals and/or hydrocarbon-based fuels, especially for heating systems or internal combustion engines, takes organic residues or waste materials and decontaminates or sterilizes them with a hydrogenation process. In particular, the materials classified as K1, K2 or K3 according to EU Directive 1774/2002 are used for generating or producing the cited starting materials or additives, whereby an adequate decontamination of the residues or waste materials that are classified as being hazardous to health is ensured.

17 Claims, No Drawings

IDENTIFICATION AND PROCESSING OF SECONDARY MATERIALS FOR THE COSMETICS-, PHARMACEUTICAL-, AND FUEL-PRODUCING INDUSTRIES AND ALSO FURTHER INDUSTRIAL FIELDS OF APPLICATION

CROSS-REFERENCE TO RELATED APPLICATIONS

This application is a national stage application (under 35 U.S.C. §371) of PCT/EP2007/009224, filed Oct. 24, 2007, which claims benefit of German application 10 2006 050 499.2, filed Oct. 26, 2006.

DESCRIPTION

The invention relates to a method for the production of thermoplastics, candles or heat storing material, as well as starting materials or additives for cosmetics, pharmaceuticals and/or hydrocarbon-based fuels.

BACKGROUND AND STATE OF THE ART

Due to the existing and increasing scarcity of raw materials, there is a need to develop new processing routes, application areas and reutilization possibilities for waste materials so that they can be re-used with the least possible impairment of the quality. The new trend towards considering waste products from primary application areas as recyclable material and towards returning these materials to the economic cycle—a trend that can be observed in all sectors of society—is based not only on environmental but also, to an increasing extent, on economic and financial standpoints.

For example, the raw materials used today for candle production are primarily paraffin or beeswax. Slow-burning candles and oil lamps also use solid or hardened vegetable fats or fish oil. In order to improve the processability to create gloss effects and the like, microwaxes or vegetable hard waxes, such as Candelila wax, Canuba wax or Japan wax, can be admixed.

These substances are exclusively mineral or vegetable fats and/or oils that are each extracted separately from a single starting material.

The mineral oils and fats that can be used as raw material for candle production such as, for example, the oil derivative paraffin, are obtained when crude oil is processed. Due to the limited crude oil reserves and the improved processing techniques of the oil-processing industry, the refining of oil yields fewer and fewer of such oil derivatives that can be used, for instance, for the production of candles.

Organic fats and oils, in turn, can be subdivided into animal and vegetable fats and oils. Vegetable and animal fats and oils are monoglycerides, diglycerides or triglycerides of medium-chain or unsaturated fatty acids.

Moreover, the preparation of food in the commercial and private sectors uses large amounts of plant-based cooking oils and fats, especially for cooking and deep-frying. The portion of these fats that is not consumed has to be reutilized as a residual substance. In Germany, the greatest potential for collecting cooking and deep-frying fats is from the catering sector and from the food-processing industry.

In the past, animal fats and oils that are obtained as slaughterhouse by-products went largely into the mixed animal feed industry. Such materials have to be removed from the food chain for human consumption.

In order to achieve this, these products have so far been used in the chemical industry for lubricants and, to an ever-increasing extent, also for energy utilization in heating and power plants, biogas plants and biodiesel plants.

Furthermore, the food-processing industry produces organic waste in the form of animal and plant waste, as well as discarded food residues. The handling of such waste or residual substances is complex and very cost-intensive because of the applicable hygiene and health regulations. In the case of animal waste, along with the hygienic concerns, aspects that fall under the epidemics legislation also have to be taken into consideration. As a consequence of the animal epidemics that have occurred recently, at times globally but at the very least supra-regionally and that were transmitted especially by animal waste, animal waste is subject to special strict stipulations.

In this context, EU Directive 1774/2002 dated Oct. 3, 2002 stipulates the hygiene regulations for animal by-products that are not intended for human consumption. These by-products are divided into three categories: Category 1, Category 2 and Category 3, below referred to as K1, K2 and K3, depending on their hazard potential and on the anticipated risks for human health. The focus is on the risk of the spread of pathogens that cause diseases or epidemics via the animal feed chain.

According to EU Directive 1774/2002, K1 material is, among other things, animal material suspected of harboring TSE, especially in pets, zoo animals and circus animals, as well as in animal carcasses that contain specific risk material, as well as kitchen and food waste that is transported across international borders. Animal material suspected of harboring TSE includes all animals with transmittable spongiform encephalopathies such as, for example, BSE.

K2 material includes, among other things, animal excrement such as liquid manure, stomach and intestine contents as well as animals and parts of animals that died in a manner other than being slaughtered, including animals from epidemic control programs.

K3 materials include, among other things, kitchen and food waste that has not been transported across international borders and that is intended for animal feed or for use in a biogas or composting plant. Moreover, this category also includes fish and other marine animals as well as fish waste and discarded food of animal origin that, due to such a hygienic or health risk, is no longer intended for human consumption, for example, because of defective packaging. In short, category K3 comprises all animal waste that does not entail a suspicion or indication of diseases that can be transmitted to humans or animals.

EU Directive 1774/2002 dated Oct. 3, 2002 provides the following summary definitions of K1, K2 and K3 material. Category 1 material comprises the following animal by-products:

all body parts body, including hides and skins, of animals suspected of being infected by a transmissible spongiform encephalopathy (TSE) or in which the presence of a TSE has been confirmed, animals killed in the context of TSE eradication measures, pet animals, zoo animals and circus animals, experimental animals, wild animals suspected of being infected with a communicable disease;
  specified risk material as tissues likely to carry an infectious agent;
  products derived from animals that have absorbed prohibited substances or substances containing products dangerous for the environment;

all animal material collected when treating waste water from category 1 processing plants and other premises in which specified risk material is removed;

catering waste from means of transport operating internationally;

mixtures of category 1 with category 2 and/or category 3 material.

Category 2 material comprises the following animal by-products:

manure and digestive tract content;

all animal materials other than those belonging to category 1 collected when treating waste water from slaughterhouses;

products of animal origin containing residues of veterinary drugs and contaminants in concentrations exceeding the Community limits;

products of animal origin, other than category 1 material, that are imported from third countries and fail to comply with the Community veterinary requirements;

animals other than category 1 that have not been slaughtered for human consumption;

mixtures of category 2 and category 3 material.

Category 3 material comprises the following animal by-products:

parts of slaughtered animals which are fit for human consumption but are not intended for human consumption for commercial reasons;

parts of slaughtered animals which are rejected as unfit for human consumption but are not affected by any sign of a communicable disease;

hides and skins, hooves and horns, pig bristles and feathers originating from animals that are slaughtered in a slaughterhouse and were declared fit for human consumption after undergoing an ante mortem inspection;

blood obtained from animals declared fit for human consumption after undergoing an ante mortem inspection, other than ruminants slaughtered in a slaughterhouse;

animal by-products derived from the production of products intended for human consumption, including degreased bones and greaves;

former foodstuffs of animal origin, other than catering waste, which are no longer intended for human consumption for commercial reasons or due to problems of manufacturing or packaging defects;

raw milk originating from animals that do not show any signs of a communicable disease;

fish or other sea animals, except sea mammals, caught in the open sea for the purpose of fishmeal production, and fresh by-products from fish from plants manufacturing fish products for human consumption;

shells of eggs originating from animals that do not show any signs of a communicable disease;

blood, hides and skins, hooves, feathers, wool, horns, hair and fur originating from healthy animals;

catering waste other than category 1.

Until now, the materials classified according to EU Directive 1774/2002 have only been candidates for reutilization to a limited extent. At the present time, the only options for K1 materials are incineration including pretreatment in approved plants as well as, under certain circumstances, burying in approved landfills. In addition to being taken to incineration plants and landfills, a few K2 materials can also, for example, be treated in biogas or composting plants and, in certain cases, can also be spread onto agricultural land. However, for K1 and K2 materials, the obligation fundamentally exists that they have to be disposed of by state and local authorities.

Currently, only the K3 materials are exempted from the obligation to be collected and disposed of by state and local authorities. Such materials can at best be recycled for use in biogas or composting plants, in the production of pet food or in specially approved fat-processing facilities.

In view of the current health risk potential associated with K1 and K2 materials, such residues or waste materials cannot be reutilized in an economically feasible manner.

International patent application WO 2005/010135 A1 discloses a method for the production of candles or heat storing material. In a first method step, a mixture of lipid-containing materials as the starting material is washed and comminuted, in a second method step, the lipids are isolated and then the lipids are facultatively esterified and/or refined and/or hydrogenated to form the raw material for the candle production or the heat storing material.

In order to produce thermoplastics, candles or heat storing material, the obtained raw material has to be refined in complex physical and/or chemical processes in order to be purified. Since the starting material can contain mineral, organic as well as synthetic oils and/or fats, such refining is energy-intensive, time-consuming and costly. Thus, after the fractionated (vacuum) distillation of crude oil, the mineral oils still contain sulfur, oxygen, nitrogen and other impurities, as well as multiple bonds and cyclic hydrocarbons. These undesired components, which, already after a short time of use, lead to ageing phenomena such as dark discoloration, increased viscosity, formation of acids and oil sludge, are removed during the refining and/or hydrogenation process through the chemical and/or physical reaction with hydrogen, as a result of which an improvement in the quality is achieved. The reaction of hydrogen with the foreign atoms that are present sometimes gives rise to toxic by-products such as hydrogen sulfide or ammonia.

Vegetable fats have to be refined since the raw oils still contain various accompanying substances such as, for example, pigments, odorous substances, flavorings and bitter substances that are usually undesired for reasons having to do with shelf life, appearance and further technical processing. The refining process goes through several stages here. Consequently, the refining of natural oil or fats is energy-intensive, time-consuming and costly.

SUMMARY OF THE INVENTION

The present invention is thus based on the objective of making reutilization possible for organic residues or waste materials, especially material that is classified as K1, K2 and/or K3. The objective of the invention is also to allow additional reutilization possibilities for such residues or waste materials that, at times, are hazardous to health, without these substances posing a hazard or impairment to health. Moreover, the invention is aimed at putting forward a method for the production of candles or heat storing material in order to make the energy-intensive, time-consuming and costly production of thermoplastics, candles and/or heat storing materials more efficient.

The method according to one aspect of the invention is configured for the production of starting materials or additives for cosmetics, pharmaceuticals and/or hydrocarbon-based fuels for internal combustion engines. In this process, organic residues or waste materials undergo a hydrogenation process for purposes of decontamination or sterilization. The hydrogenation process takes place under a pressure of 2 to 50 bar and makes use of a catalyst at a temperature ranging from 200° C. to 280° C. [392° F. to 536° F.] for an exposure time t. Such a hydrogenation process can be used to absolutely reliably and safely eliminate contaminants and germs that are harmful to health, such as bacteria, fungi, viruses, prions and proteins, so that the starting materials or additives that can be produced by means of the hydrogenation process can be used safely for all kinds of further applications, for example, in the cosmetic and pharmaceutical industries or even for the production of fuels or combustion material.

In this process, the protein-like substances contained in the organic residues or waste materials are completely denatured with and without nucleic acids, so that the method according to this aspect of the invention lends itself in general for the further processing and reutilization of fats of all categories for which an economically feasible reutilization is an option.

Residues or waste materials are so-called secondary materials. The term "secondary materials" refers to materials that had previously been used in a primary application sector and that were originally intended for the purpose associated with this application. Secondary materials as set forth in this application especially include used deep-frying oils, old food fats, out-of-date and used fats from the food-processing industry, animal and fish fats as well as animal and fish oils of all categories K1 to K3, and their mixtures in any ratios, as well as fatty acids, especially after re-esterification with glycerin. Moreover, hydrocarbons and other organic waste are possibilities as secondary materials.

The starting materials or additives that can be produced by means of the method according to one aspect of the invention are suitable as ingredients for creams, ointments and lotions in various forms of application or administration. Consequently, these starting materials and additives can then be used for a wide variety of substances that, in turn, can be used as base substances or carrier substances for fats, for example, having different melting points. Here, the melting points of the producible starting materials or additives can be set as desired within a predefined range through the appropriate selection of the hydrogenation parameters such as, for example, pressure, temperature and exposure time, and suitable catalysts or catalyst mixtures can be used within the scope of the hydrogenation process.

Moreover, the starting materials or additives that can be produced according to one aspect of the invention can be used as active-ingredient carrier materials in the pharmaceutical industry for the production of various pharmaceuticals.

Furthermore, the starting materials or additives that can be produced according to one aspect of the invention are suitable for use as fuels for internal combustion engines which, at times, operate at high levels of compression in the combustion chamber. In this context, it is provided, among other things, that advantageous properties can be tailored to the particular area of application through the fractionation or lengthening of the carbon chain of the starting materials or additives.

Moreover, it is provided for the starting materials or additives that can be produced according to one aspect of the invention to be used for the production of lighting means, especially candles.

According to a first advantageous aspect of the invention, it is provided that the exposure time t during which the hydrogenation process takes place, is at least 20 minutes. Here, it is especially provided that, during the exposure time, a pressure of at least 3 bar prevails in a hydrogenation installation. The duration of the hydrogenation is pressure-dependent and often has to be regulated, taking into account the residues or waste materials fed into the hydrogenation installation. Here, it is generally the case that a shorter exposure time can be achieved at a higher pressure and vice versa.

During the hydrogenation process, all of the method parameters, namely, temperature, pressure, time as well as the type and quantity of the material fed into the hydrogenation installation should be continuously logged and monitored so as to adequately ensure the safety of the starting materials or additives that can be produced by means of the hydrogenation process.

According to another embodiment of the invention, it is provided that a refining process is performed in order to purify the residues or waste materials before the hydrogenation process is carried out. The impurities present in the organic residues or waste materials can be removed from the raw material by means of such a refining process. The refining process is executed primarily under exposure to heat over a period of time of about 12 to 60 minutes, whereby temperatures ranging from 70° C. to 130° C. [158° F. to 266° F.] are preferably selected. Here, various adsorption media such as activated charcoal, bleaching clay, TriSyl and similar media are added in varying concentrations, typically in the range between 3% and 12%, to the residues or waste materials that are fed to the refining process.

During the refining process, the residues or waste materials, which are mainly present in liquid form because of the exposure to heat, are separated by means of filter elements, whereby such a filtration process, which follows the actual refining step, can be repeated one or more times.

In this context, it can be particularly advantageous for the liquid fraction to undergo a washing procedure with citric acid, lye, phosphoric acid and water, if applicable, several times, with contact times of several minutes and different stirring speeds, for example, 10 to 500 rpm, in order to remove undesired elements such as phosphates or mucilaginous substances from the refined residues or waste materials.

Here, in particular, the repeated execution of the refining process and of the subsequent filtration is advantageous, as a result of which a high degree of purity can be achieved. The individual exposure time, the temperature, the electric charge and the selection of adsorption media and their concentrations can be varied among the recurrent cycles.

According to a refinement of the invention, it is provided that, before the hydrogenation process, the residues or waste materials, which optionally had been previously refined, are filtered. In this filtration process, which, for example, follows a refining process, the liquid product separated during the refining process is fed into a filtration press, for instance, at 90° C. [194° F.] under pressure or negative pressure, so that the adsorption media added to the refining process can be separated from the refined residues or waste materials by means of a filtration medium.

Any supernatant or filtration cake can be disposed of in a controlled manner, for example, by incineration. The adsorption medium can, at times, be used again one or two times in multiple filtration cycles before its effectiveness limit is reached.

In order to avoid contamination by tainted material such as K1 or K2 materials, the filtration process is preferably carried out under vacuum conditions, for example, at a pressure of a few bar, preferably 1 to 2 mbar. The filtration cake formed during the filtration is aspirated into closed vessels and preferably disposed of by incineration.

According to another embodiment of the invention, it is provided that, before the hydrogenation process and after a refining or filtration process, the refined and/or filtered residues or waste materials are deodorized. During the deodorization, the material undergoes a so-called vacuum distillation at a pressure of about 1 to 3 mbar with the application of heat and steam at about 200° C. to 330° C. [392° F. to 626° F.]

for 15 to 60 minutes. In this process, free fatty acids are distilled and diverted for further use.

So-called secondary material may be used as residues or waste materials. Secondary materials encompass all materials that—in comparison to the starting materials or additives that can be produced according to the invention—had other applications in a primary application area and that were also originally intended for another application purpose. Examples of such secondary materials especially include used frying oils, old food fats, out-of-date and used fats that are collected in the food-producing or food-processing industries, as well as all animal fats and oils, and also animal waste, especially including the above-mentioned K1, K2 and K3 materials. Moreover, all substance combinations of the above-mentioned starting materials in any mixing ratios as well as fatty acids obtained by means of re-esterification with glycerin are to be considered as secondary materials as set forth in this application.

According to another preferred embodiment of the invention, the residues or waste materials include especially those materials classified as K1, K2 or K3 according to EU Directive 1774/2002. The method herein ensures an adequate decontamination and sterilization of such animal waste that has been classified as being hazardous to health. Studies have shown that the risk reduction that can be achieved with the methods herein—in an unfavorable scenario—is $2.2 \times 10^{-16}$. This corresponds to one case of disease in the world population every 100,000 years. Therefore, the starting materials or additives produced can be said to be absolutely safe and not harmful to the health of humans and animals.

Moreover, a microbial synthesis capacity is provided, whereby a de novo synthesis from activated $C_2$ precursors of fatty acids and fats is carried out by prokaryotes, eukaryotes, algae, fungi and yeasts. The substrates offered to these microorganisms are organic waste, old fats, fats, fatty acids, mixtures thereof and hydrocarbons in general, whereby genetically modified or cultivated microorganisms are possibilities for varying the survival conditions or for increasing and stabilizing the synthesis capacity.

Different microorganisms, also modified by means of gene transfer or cultivating, can serve as the substrate for various C donors, including fats of all categories and hydrocarbons in general.

Under suitable conditions, hydrocarbons with different and changeable chain lengths with numerous application possibilities are produced de novo. Here, among other things, a decontamination step is to be fundamentally assumed, since a de novo synthesis of the materials occurs due to metabolic steps of the microorganisms themselves via the structuring brought about by the addition of activated precursor units of $C_2$ up to a defined chain length.

Gene transfers within species or even between species can be used to transfer desirable properties such as, for example, an increase in the synthesis capacity.

In order to ensure a further decontamination of the material after the de novo synthesis, a hydrogenation according to the above-mentioned pattern can follow which, at the same time, involves changes in the desired properties of the produced material, and which can provide the desired properties for additional utilization routes.

According to another advantageous aspect, it is provided that, before the hydrogenation, microorganisms that metabolize organic fats and/or oils and/or carbon compounds and/or hydrocarbon compounds are added to the optionally filtered and/or refined residues or waste materials. Here, especially the synthesis capacity provided by the microorganisms such as, for example, bacteria, fungi, yeasts or algae is utilized in an advantageous manner. For this purpose, various microorganisms, also those modified by gene manipulation, can be used as the substrate for various carbon donors.

Under suitable conditions, even hydrocarbons and hydrocarbon compounds can be produced with different chain lengths that can be specified largely as desired by means of external parameters. Thus, the invention aims especially at any $C_{16}$ and/or $C_{18}$ carbon chains. Within the scope of the use of microorganisms, fundamentally only a subsequent decontamination step is to be assumed since here, a de novo synthesis of the materials occurs via the structuring brought about by the addition of $C_2$.

Due to the use of microorganisms—for example, prokaryotes, eukaryotes and/or fungi—that metabolize mineral and/or organic and/or synthetic fats and/or oils and/or carbon compounds and/or hydrocarbon compounds, it is advantageously possible to dispense with a chemical refining of the obtained raw materials. Here, the starting materials are degraded in a bioreactor by adding the microorganisms. The products obtained here are especially raw materials for candles and/or heat storing material, particularly waxes, wax esters and wax alcohols as well as starting materials and additives for cosmetics, pharmaceuticals and/or fuels for heating systems or internal combustion engines. These products are then harvested from the bioreactor in which the metabolization takes place and are then further processed by means of a drawing, compression, casting, foaming or paste-forming filling process to create, for example, candles and/or heat storing material, whereby mixtures with paraffin and other oils and/or fats are also possible.

The microorganisms metabolize the fats and oils in the starting material to form the raw materials, especially waxes, wax esters and wax alcohols. The fatty acid syntheses of prokaryotes, eukaryotes and fungi take place through a cyclic, gradual lengthening by activated precursors of two carbon units. The carbon units are released as soon as a chain length of $C_{16}/C_{18}$ has been reached. In the microorganisms or bacteria, all of the reactions of monofunctional proteins are carried out in a dissociated or Type II fatty acid synthase system.

As microorganisms, it is possible here to use non-pathogenic mycobacteria and/or *Vibrio fumissii* M1 and/or *Alcanivorax* and/or *Fundibacter jadensis* and/or *A. calcoacetius* and/or *Acinetobacter* sp., especially of the types NRRL B-14920, 14921, 14923, and/or *coryneforme* NRRL B-14922 and/or actinomycetes and/or *Micrococcus cryophilus* and/or Neisseriaceae or the like.

According to an advantageous embodiment of the invention, it is provided that genetically modified microorganisms are used in order to increase the synthesis capacity of the microorganisms or the yield of the raw materials obtained for candles and/or for heat storing materials. Through gene transfer, such microorganisms are made capable of producing hydrocarbons. Only by way of example, mention is made here of the recombinant *E. coli* DH 5 clone that carries the *Acinetobacter* sp pha locus on plasmid pJKD 1425. *E. coli* pJKD 1425 carries genes that are necessary for PHB biosynthesis and that are controlled by the *Acinetobacter* promoters. These gene transfers, which are necessary to form efficiency-enhancing hydrocarbons, can be transferred analogously to other microorganisms such as, for example, fungi.

Through bacterial metabolic processes, the microorganisms turn the various substrates into the processable raw materials needed for the production of thermoplastics, candles and/or heat storing material such as, for example, waxes, wax esters and wax alcohols. Possible substrates are, for example, petrochemical products such as crude oil, heavy oil, old oil and the like, as well as food residues, old food fats, food fats, natural oils and natural fats of vegetable and animal origin, for example, oil seeds, as well as mixtures thereof in all ratios.

The waxes thus produced have different material properties, depending on the microorganism employed. They can be solid to brittle, soft to hard and, if the room temperature is above 40° C. [104° F.], can melt so as to be low-viscous. Through different microorganisms, waxes of different colors, for example, white to opaque, can be synthesized. If these waxes or the like are used for candle production, the raw materials synthesized by the microorganisms are practically free of ash-forming compounds when they are burned. The waxes can be harvested in a simple manner in the form of intracellular and/or extracellular deposits as a bacterial final product. The raw materials produced by the microorganisms are carbon chains of different chain lengths but primarily $C_{16}$ to $C_{18}$ components. Other chain lengths can also occur, depending on the substrate and microorganism used in the bioreactor.

The entire process takes place without posing an environmental burden and can be sustained as long as the conditions for the survival of the microorganisms exist in the bioreactor.

Since the microorganisms employed are apathogenic, there are no risks to the environment or to living organisms.

The metabolization capacity of the microorganisms replaces the complex physical and/or chemical refining process that is otherwise required for the use of the above-mentioned starting materials. As a result, an energy-intensive chemical and/or physical process can be dispensed with, thus lowering the production costs and avoiding any disposal problems. There is no need for the disposal of potentially toxic waste products that are formed during the known refining process such as, for example, hydrogen sulfide or ammonia.

The microorganisms are cultivated in bioreactors under defined conditions regarding nutrient media, substrate, pressure, temperature, salt content and pH value. For various raw materials used for the production of candles or heat storing material, the production conditions relating to these parameters can be adapted and optimized. The literature (Berthe-Corti, Bredemeier et al., Mar. Biotechnol, 5, 579-583, 2003) describes, for example, the facultatively anaerobic *Alcanivorax* that produces, among other things, wax in an aerobic, submersed manner, under normal pressure in salt water and at a temperature of about 300 K as well as at a pH value of 7.2 with the addition of sodium and phosphorus—for the growth of the microorganisms—and at an oxygen tension of greater than 2%. The growth of the microorganisms and their wax production occur through the same media—(old) fats and/or (old) oils, N-alkanes, vegetable oils—in submersed fermentation.

Here, the various substrates, depending on the desired product, are added to the bioreactor and the final product, for example, waxes, wax esters, wax alcohols, biosurfactants or the like, are harvested by appropriate process steps. Here, it has proven to be advantageous to harvest the obtained raw materials for candles and/or heat storing material by means of centrifugation, filtration, fragmentation, solvent elution or the like.

According to another idea of the invention, it is provided for the raw materials that are harvested from the bioreactor and intended for candles and/or heat storing material to be further processed by means of purification, solvent extraction, centrifugation, distillation, bleaching, esterification, re-esterification and/or hydrogenation, especially up to an iodine number of less than 40, whereby other iodine numbers are also possible, before the final drawing, compression, casting, foaming or paste-forming filling process. This measure makes it possible to produce candles or heat storing material having the desired consistency and composition.

For this purpose, it is also provided that, before the further processing in the drawing, compression, casting, foaming or paste-forming filling processes, the raw materials harvested from the bioreactor and intended for candles and/or heat storing material are mixed with paraffins, waxes, fats, oils, stearins or similar materials that are suitable for the production of candles or heat storing material.

In order to take olfactory and visual aspects into consideration, before the further processing in the drawing, compression, casting, foaming or paste-forming filling processes, the raw materials harvested from the bioreactor and intended for candles and/or heat storing material are mixed with scents, perfume oils, colorants or similar additives.

According to another idea of the invention, it is provided that the microorganisms are cultivated in the bioreactor in oxygenated water, especially in seawater. In this environment, the microorganisms have proven to be especially productive in terms of metabolizing the starting material to form the desired raw materials.

Here, it has proven to be advantageous to cultivate the microorganisms in the bioreactor under a pressure ranging from $0.5 \times 10^5$ pascal to $1.5 \times 10^5$ pascal, especially $1 \times 10^5$ pascal. Under these pressure conditions, the microorganisms have proven to be especially productive in terms of metabolizing the starting material to form the desired raw materials.

In order to further optimize the ambient conditions in order to cultivate the microorganisms and to further increase their productivity, the microorganisms are cultivated in the bioreactor at a temperature of 283 Kelvin to 323 Kelvin, especially 293 Kelvin to 303 Kelvin.

Candles and other heat storing material may be produced by means of the methods herein.

According to another independent aspect, organic residues or waste materials may be used for the production of starting materials or additives that are suitable for cosmetics, pharmaceuticals and/or hydrocarbon-based fuels for heating systems or internal combustion engines. In particular those organic residues or waste materials that are classified according to EU Directive 1774/2002 as K1, K2 or K3 materials, may be reused, especially for applications in the realm of cosmetics and pharmaceuticals as well as for the production of fuels.

The starting materials to be produced can be used in the cosmetics realm as ingredients for creams, ointments and lotions in a variety of forms of administration. Here, the fats produced can be used as the base substance or carrier substance having different melting points that can be set largely at will.

In the pharmaceutical industry, active ingredients can be embedded into the fat processed according to the invention as an active ingredient carrier material and can also be generally varied in accordance with desired parameters by means of pharmacokinetics.

Fuels made of the materials that can be produced can be used with certain limitations—in some cases due to their physical consistency or impurities—especially as admixtures for conventional fuels.

Moreover, the removal of impurities for the production of clear oils is also possible. The described further processing also allows the use of the substances that can be thus obtained as fuel for different combustion systems, also those that operate at high levels of compression and pressures. Further processing can be carried out by means of fractionation or by lengthening the carbon chain to the desired range of use, and different properties can be established, which allow their use as lubricants.

The further processing with modern synthesis methods, which relate only to the carbon chains, allows the use of these substances since the carbon chains can be further processed in accordance with the envisaged wishes and requirements. A lengthening or shortening of the chain and thus a variation of the properties are possible.

When the materials that can be produced according to the invention are processed, for example, for the purpose of producing lamps, candles, tea candles, etc., high compression and filling pressures can give rise to problems with the stability of the shell or of the filling containers. As a remedy, it is proposed, for example, to produce the tea candles or tea candle shells hexagonally—by nature the most stable shape—since this shape has the greatest stability along with the smallest space requirement and smallest walls, and moreover, the appearance of the shells, which final consumers have become accustomed to, changes as little as possible since it remains similar to the round shapes used until now. Moreover, thanks to the increased stability of the shape, material can be saved during the production of the shells or containers.

The areas of application are by no means limited to the examples listed. On the contrary, the invention comprises the area of application of all fats, especially since the processing method also safely decontaminates the K1, K2 and K3 fats.

DESCRIPTION OF EMBODIMENTS

Discarded food residues and organic residues as well as animal parts and all kinds of animal waste, especially those of the K1, K2 and K3 categories, are collected, washed, slurried in water, comminuted to a size of 2 mm to 3 mm and/or melted. The starting material thus obtained is fed into a bioreactor in which microorganisms of the *Alcanivorax* type are cultivated that are capable of metabolizing organic material, among other things, into waxes, wax esters and wax alcohols.

The metabolization of the starting material to form waxes, wax esters and wax alcohols takes place under a pressure of approximately $1 \times 10^5$ pascal and at a temperature of approximately 293 Kelvin to 203 Kelvin. In this process, the microorganisms are cultivated in oxygenated water, especially in seawater. The metabolization, depending on the microorganism used, can take place within 96 hours. The waxes, wax esters and/or wax alcohols thus produced, can be isolated by various harvesting methods after a sufficient amount has been produced by the microorganisms. These include centrifugation, filtration, fragmentation, solvent elution.

Normally, the raw material does not have the requisite properties for the desired further processing such as, for example, a pure consistency. In this case, hydrogenation is carried out under a pressure of 2 to 50 bar and using a catalyst at a temperature ranging from 200° C. to 280° C. [392° F. to 536° F.] for an exposure time t of at least 20 minutes. By means of the hydrogenation process, contaminants and germs that are harmful to health such as bacteria, fungi, viruses, prions and proteins can be eliminated absolutely reliably and safely, so that the substance or substance mixture thus obtained can be used safely for all kinds of further applications, for example, in the cosmetic and pharmaceutical industries or even for the production of fuels or combustion material such as candle wax, and heat storing material.

In particular, however, the hydrogenation does not take place exclusively up to an iodine number <40, whereby the iodine number serves as the measure for the content of unsaturated fatty acids in order to obtain a product that is user-friendly and easy to process in a subsequent casting, foaming or paste-forming filling process. Here, synthetic, mineral and/or organic fats and/or oils in any mixture ratio can be present as the starting materials.

Once the raw material thus obtained is then present in isolated form, it can be used for the production of candles or heat storing material or else universally as starting materials or additives for cosmetics, pharmaceuticals and/or in general for fuels. This can be done by means of direct further processing by means of familiar candle production methods such as, for example, drawing, compression, casting, foaming or paste-forming filling processes.

The raw material thus obtained is placed, for example, as a liquid product at about 343 Kelvin, via a heated line into a heated collecting reservoir; of course, other temperatures, for example, in the range from 317 Kelvin to 355 Kelvin are also possible. In the collecting reservoir, colorants and perfumes are added to the mixture. By the same token, other pure fats, oils and paraffins can be admixed in order to impart the product with the desired properties.

From the collecting reservoir, the hot compound is then fed into a crystallizer that, by applying a large temperature differential, causes the compound to cool off. The product is then a coarse and/or fine-crystalline powder that can be fed via a vacuum line at a different negative pressure to various presses, hydraulic presses or eccentric presses. There, the compound is further processed into candles or heat storing material by means of compacting pressure and deformation, if necessary, under heat.

In order to obtain a desired finish, heated tools can be used, as a result of which over-compression phenomena are avoided. This compression method has proven its worth as an efficient processing modality.

The liquid raw material can also be conveyed into various manually or industrially operated casting installations in which the desired candle shape is created through controlled cooling in the mold that is being filled with the liquid compound. The amount of the product flowing in can be regulated by a sensor. The cooling process can be accelerated through the application of cold or by means of refrigeration systems or fans.

In order to avoid undesired deformations or shrinkage, it is provided that a second casting process is subsequently carried out. This can likewise be done automatically or manually with different filling levels.

However, the raw material or raw material mixture can also be pre-cooled, for example, in a crystallizer, to such an extent that a pasty state is reached. In this pasty form, the raw material can be filled into a desired shaping container, if necessary, under the application of pressure.

While preferred embodiments of the invention have been described and illustrated here, various changes, substitutions and modifications to the described embodiments will become apparent to those of ordinary skill in the art without thereby departing from the scope and spirit of the invention.

The invention claimed is:

1. A method for making starting materials or additives for at least one of cosmetics, pharmaceuticals or hydrocarbon-based fuels for heating systems or internal combustion engines, candles, heat storing materials or thermoplastics, the method comprising adding microorganisms that metabolize at least one of organic fats, oils, carbon compounds or hydrocarbon compounds to materials classified as Category 1, Category 2 or Category 3 material according to EU Directive 1774/2002, wherein the Category 1 material comprising the following animal by-products:
- all body parts body, including hides and skins, of animals suspected of being infected by a transmissible spongiform encephalopathy (TSE) or in which the presence of a TSE has been confirmed, animals killed in the context of TSE eradication measures, pet animals, zoo animals and circus animals, experimental animals, wild animals suspected of being infected with a communicable disease;
- specified risk material as tissues likely to carry an infectious agent;
- products derived from animals that have absorbed prohibited substances or substances containing products dangerous for the environment;
- all animal material collected when treating waste water from category 1 processing plants and other premises in which specified risk material is removed;
- catering waste from means of transport operating internationally;
- mixtures of category 1 with category 2 and/or category 3 material;

the Category 2 material comprises the following animal by-products:
- manure and digestive tract content;
- all animal materials other than those belonging to category 1 collected when treating waste water from slaughterhouses;
- products of animal origin containing residues of veterinary drugs and contaminants in concentrations exceeding the Community limits;
- products of animal origin, other than category 1 material, that are imported from third countries and fail to comply with the Community veterinary requirements;
- animals other than category 1 that have not been slaughtered for human consumption;
- mixtures of category 2 and category 3 material; and the Category 3 material comprises the following animal by-products:
- parts of slaughtered animals which are fit for human consumption but are not intended for human consumption for commercial reasons;
- parts of slaughtered animals which are rejected as unfit for human consumption but are not affected by any sign of a communicable disease;
- hides and skins, hooves and horns, pig bristles and feathers originating from animals that are slaughtered in a slaughterhouse and were declared fit for human consumption after undergoing an ante mortem inspection;
- blood obtained from animals declared fit for human consumption after undergoing an ante mortem inspection, other than ruminants slaughtered in a slaughterhouse;
- animal by-products derived from the production of products intended for human consumption, including degreased bones and greaves;
- former foodstuffs of animal origin, other than catering waste, which are no longer intended for human consumption for commercial reasons or due to problems of manufacturing or packaging defects;
- raw milk originating from animals that do not show any signs of a communicable disease;
- fish or other sea animals, except sea mammals, caught in the open sea for the purpose of fishmeal production, and fresh by-products from fish from plants manufacturing fish products for human consumption;
- shells of eggs originating from animals that do not show any signs of a communicable disease;
- blood, hides and skins, hooves, feathers, wool, horns, hair and fur originating from healthy animals;
- catering waste other than category 1, to produce resulting materials; then hydrogenating the resulting materials under a pressure of about 2 bar to about 50 bar in the presence of a catalyst at a temperature of 200° C. to 280° C. for an exposure time t.

2. The method of claim 1, wherein the exposure time t is at least 20 minutes.

3. The method of claim 1, further comprising refining the classified materials or the resulting materials to purify the classified materials or the materials before hydrogenation.

4. The method of claim 3, further comprising filtering the refined materials before hydrogenation.

5. The method of claim 1, further comprising deodorizing the classified materials or the resulting materials before hydrogenation.

6. The method of claim 1, wherein the microorganisms are selected from the group consisting of mycobacteria, *Vibrio furnissii* M1, *Alcanivorax, Alcanivorax calcoacetius, Acinetobacter* sp., coryneform NRRL B-14922, *Actinomycetes, Micrococcus cryophilus, Neisseriaceae, E. coli* clone pJKD 1425, and mixtures of two or more of the foregoing.

7. The method of claim 1, wherein the microorganisms are genetically modified or cultivated.

8. The method of claim 1, further comprising harvesting the hydrogenated materials from a bioreactor and subjecting the hydrogenated materials to a final drawing, compression, casting, foaming or paste-forming filling process.

9. The method of claim 8, further comprising before the final drawing, compression, casting, foaming or paste-forming filling process, mixing the hydrogenated materials with a paraffin, a wax, a fat, an oil, a stearin or a material that is suitable for the production of thermoplastics, candles or heat storing material.

10. The method of claim 8, further comprising the final drawing, compression, casting, foaming or paste-forming filling processes, mixing the hydrogenated materials with a scent, a perfume oil, or a colorant.

11. The method of claim 7, wherein the microorganisms are cultivated in a bioreactor in oxygenated water.

12. The method of claim 7, wherein the microorganisms are cultivated in a bioreactor under a pressure of $0.5 \times 10^5$ pascal to $1.5 \times 10^5$ pascal.

13. The method of claim 7, wherein the microorganisms are cultivated in a bioreactor at a temperature of 283 Kelvin to 323 Kelvin.

14. The method of claim 12, wherein the pressure is about $1 \times 10^5$ pascal.

15. The method of claim 6, wherein the *Acinetobacter* sp. is selected from the group consisting of the *Acinetobacter* sp. types NRRL B-14920, 14921 and 14923.

16. The method of claim 7, wherein the microorganisms are cultivated in a bioreactor facultatively and anaerobically.

17. The method of claim 7, wherein the microorganisms are cultivated in a bioreactor facultatively and anaerobically in seawater or salt water.

* * * * *